(12) United States Patent
Suzuki et al.

(10) Patent No.: US 10,061,042 B2
(45) Date of Patent: Aug. 28, 2018

(54) RADIATION IMAGING APPARATUS AND RADIATION IMAGING SYSTEM

(71) Applicant: CANON KABUSHIKI KAISHA, Tokyo (JP)

(72) Inventors: Masataka Suzuki, Kawasaki (JP); Motoki Tagawa, Chigasaki (JP); Hiroto Kondo, Yokohama (JP); Shinichi Nishimura, Yokohama (JP); Takashi Sato, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 150 days.

(21) Appl. No.: 15/090,687

(22) Filed: Apr. 5, 2016

(65) Prior Publication Data
US 2016/0299241 A1 Oct. 13, 2016

(30) Foreign Application Priority Data

Apr. 13, 2015 (JP) ................................. 2015-082061

(51) Int. Cl.
*H01J 31/50* (2006.01)
*G01T 7/00* (2006.01)
*G01T 1/20* (2006.01)
*G03B 42/04* (2006.01)

(52) U.S. Cl.
CPC .............. *G01T 7/00* (2013.01); *G01T 1/2018* (2013.01); *G03B 42/04* (2013.01)

(58) Field of Classification Search
CPC ........... G01T 1/17; G01T 7/00; G01T 1/2018; G03B 42/04
See application file for complete search history.

(56) References Cited

U.S. PATENT DOCUMENTS

| | | | |
|---|---|---|---|
| 7,112,800 B2* | 9/2006 | Sato | .................. H01L 27/14618 250/370.09 |
| 2009/0050813 A1* | 2/2009 | Sato | .................. H01L 27/14676 250/370.01 |
| 2013/0077763 A1* | 3/2013 | Tagawa | ..................... A61B 6/10 378/189 |
| 2015/0342553 A1 | 12/2015 | Sato et al. | ........... A61B 6/5258 |
| 2016/0252629 A1* | 9/2016 | Hiratsuka | ............. G01T 1/2018 250/369 |

FOREIGN PATENT DOCUMENTS

| | | | | |
|---|---|---|---|---|
| CN | 101390213 A | 3/2009 | | |
| DE | 102012211909 A1 * | 1/2014 | ........... | G01T 1/2018 |
| JP | 3818271 | 9/2006 | | |

* cited by examiner

*Primary Examiner* — Courtney Thomas
(74) *Attorney, Agent, or Firm* — Fitzpatrick Cella Harper and Scinto (57) ABSTRACT

A radiation imaging apparatus includes a housing including an incident surface of radiation, an imaging panel stored in the housing and including an effective region for detecting radiation incident through the incident surface, a buffer member arranged between the incident surface and the imaging panel, and an electrically conductive member fixed to the buffer member. An edge of the electrically conductive member surrounds an edge of the effective region in a planar view with respect to the incident surface.

15 Claims, 6 Drawing Sheets

RADIATION IMAGING APPARATUS AND RADIATION IMAGING SYSTEM

BACKGROUND OF THE INVENTION

Field of the Invention

The present invention relates to a radiation imaging apparatus and a radiation imaging system.

Description of the Related Art

Along with upsizing of radiation imaging apparatuses, the influence of radiation noise from the outside of the radiation imaging apparatus on conversion elements and TFTs is not negligible. To reduce such radiation noise, Japanese Patent No. 3818271 proposes a radiation imaging apparatus in which a region around an active matrix substrate is covered with a conductive electromagnetic shield.

SUMMARY OF THE INVENTION

The electromagnetic shield in Japanese Patent No. 3818271 is directly fixed to a housing. Therefore, if an impact is externally applied to the radiation imaging apparatus, the electromagnetic shield may be broken. Some embodiments of the present invention provide a technique of improving the impact resistance of an electrically conductive member for reducing radiation noise.

According to some embodiments, a radiation imaging apparatus comprising: a housing including an incident surface of radiation; an imaging panel stored in the housing and including an effective region for detecting radiation incident through the incident surface; a buffer member arranged between the incident surface and the imaging panel; and an electrically conductive member fixed to the buffer member, wherein an edge of the electrically conductive member surrounds an edge of the effective region in a planar view with respect to the incident surface, is provided.

Further features of the present invention will become apparent from the following description of exemplary embodiments (with reference to the attached drawings).

DESCRIPTION OF THE EMBODIMENTS

Embodiments of the present invention will be described below with reference to the accompanying drawings. The same reference numerals denote the same elements throughout various embodiments and a repetitive description thereof will be omitted. The embodiments can be appropriately changed and combined. In the following description, radiation includes α-rays, β-rays, γ-rays, X-rays, particle beam, and cosmic rays.

Figure 1A:
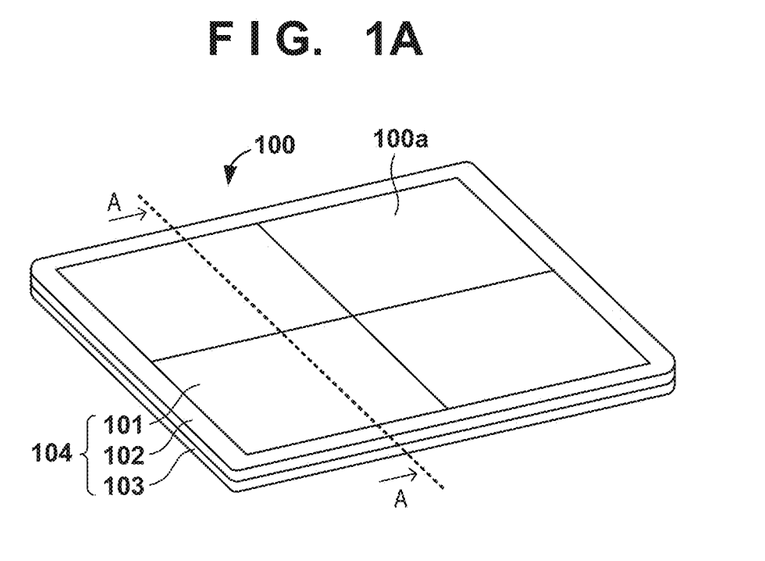
FIGS. 1A and 1B are perspective views respectively showing a radiation imaging apparatus according to some embodiments.
Figure 1B:
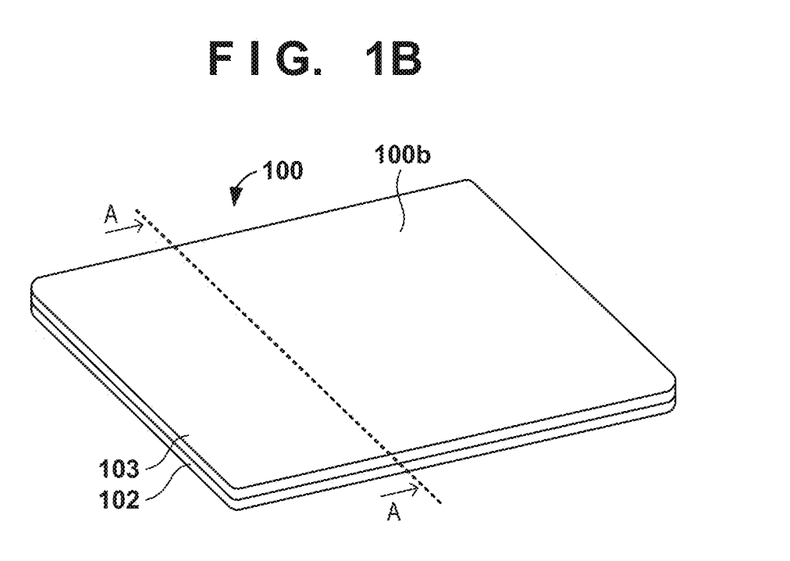
Figure 2A:
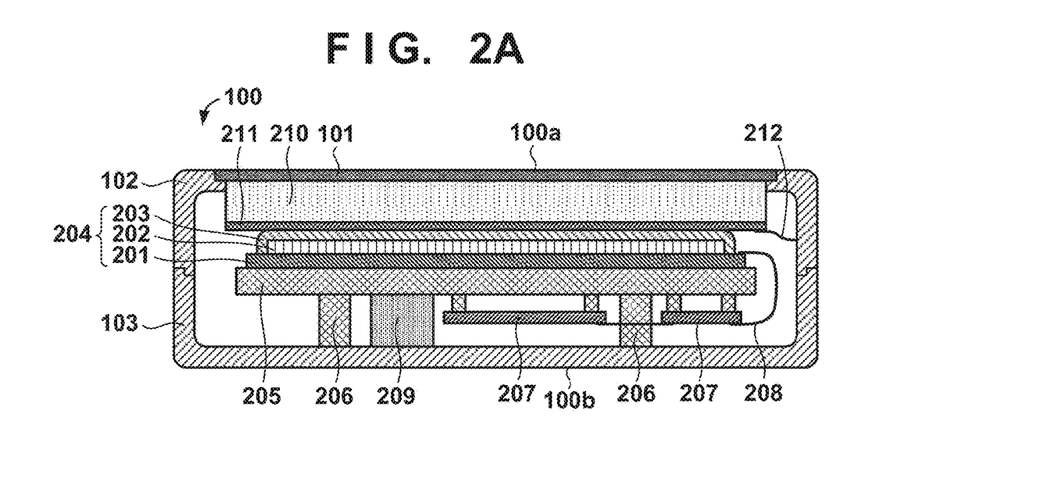
FIGS. 2A and 2B are a sectional view and plan view, respectively, showing the radiation imaging apparatus shown in FIGS. 1A and 1B.
Figure 2B:
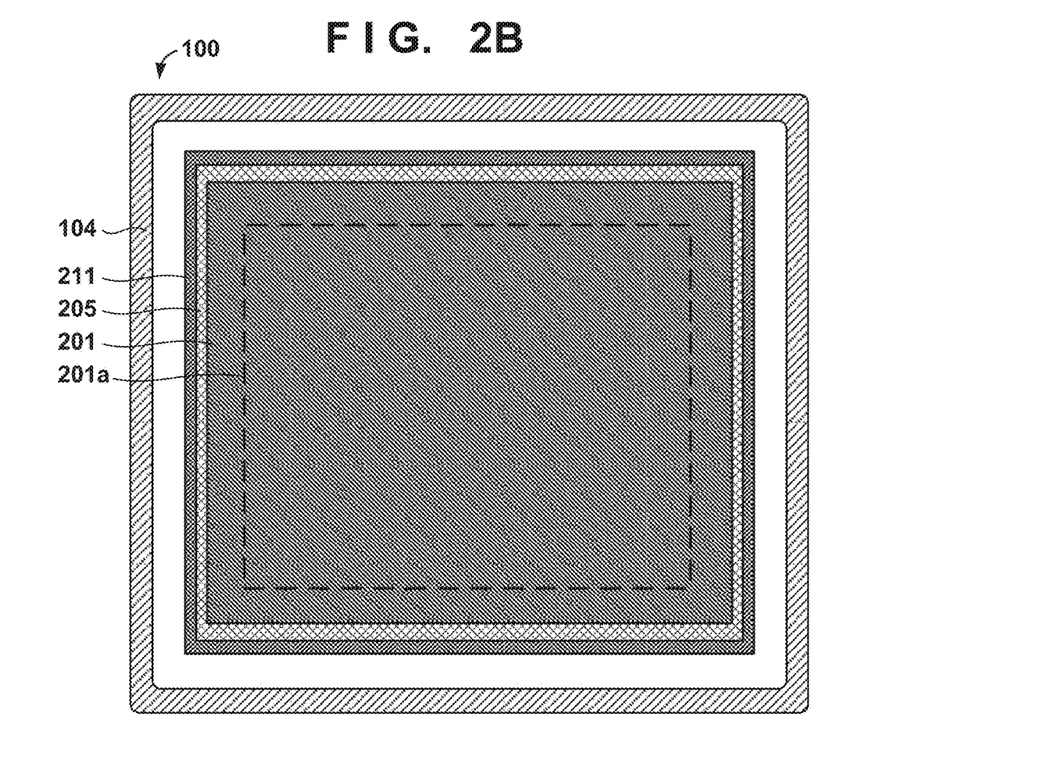

FIGS. 1A and 1B are perspective views respectively showing the outer appearance of a radiation imaging apparatus 100 according to some embodiments. FIG. 1A shows the radiation imaging apparatus 100 so that a surface (to be referred to as an incident surface 100a hereinafter) on which radiation is incident faces upward, and FIG. 1B shows the radiation imaging apparatus 100 so that a surface (to be referred to as a rear surface 100b hereinafter) on the opposite side of the incident surface 100a faces upward. FIG. 2A is a sectional view taken along a line A-A in FIGS. 1A and 1B and showing the radiation imaging apparatus 100, and FIG. 2B is a plan view showing the radiation imaging apparatus 100. Note that FIG. 2B shows only some components to clarify the positional relationship between the elements.

The radiation imaging apparatus 100 includes components shown in FIG. 2A. Components such as a sensor substrate 201, a scintillator 202, a buffer member 210, and an electrically conductive member 211 in the radiation imaging apparatus 100 are stored in a housing 104. The housing 104 can also be called an exterior. The housing 104 is formed by a transmission plate 101, a frame member 102, and a rear surface member 103. The frame member 102 and the rear surface member 103 are made of a material having higher rigidity than that of the transmission plate 101, for example, a metal. The frame member 102 includes an opening in which the transmission plate 101 is fit. The transmission plate 101 is made of a material having a higher radiation transmittance than that of the frame member 102, for example, a resin. The frame member 102 and the rear surface member 103 are coupled to each other on the side surface of the radiation imaging apparatus 100. The peripheral portion of the frame member 102 and that of the rear surface member 103 form the side wall of the housing 104. The transmission plate 101 forms the incident surface 100a of the radiation imaging apparatus 100, and the inner portion of the rear surface member 103 forms the rear surface 100b of the radiation imaging apparatus 100.

The sensor substrate 201 includes a pixel array in which a plurality of pixels for converting light into an electrical signal are arrayed in a matrix. Each pixel includes, for example, a photoelectric conversion element, and a transistor, for example a TFT, for transferring charges generated by the photoelectric conversion element. A region of the sensor substrate 201, in which light from the outside of the sensor substrate 201 is detected and converted into an electrical signal, will be referred to as an effective region 201a hereinafter. An existing sensor substrate may be used as the sensor substrate 201 and a detailed description thereof will be omitted.

The effective region 201a of the sensor substrate 201 is covered with the scintillator 202. The scintillator 202 converts radiation incident on the radiation imaging apparatus 100 into light in a wavelength band detectable by the sensor substrate 201. The surface of the scintillator 202 is covered with a scintillator protective film 203. The scintillator protective film 203 is made of a material having moisture resistance, such as a hot-melt resin, and prevents the scintillator 202 from deliquescing.

The sensor substrate 201, the scintillator 202, and the scintillator protective film 203 form an imaging panel 204. A region of the imaging panel 204, in which the radiation incident on the radiation imaging apparatus 100 is converted into an electrical signal, will be referred to as an effective region hereinafter. In a planar view with respect to the incident surface 100a of the radiation imaging apparatus 100, the effective region of the imaging panel 204 coincides with the effective region 201a of the sensor substrate 201. The imaging panel 204 is an imaging panel using a so-called indirect conversion method. Instead, an imaging panel using a direct conversion method of directly converting radiation into an electrical signal without including a scintillator may be used.

The imaging panel 204, more specifically, the sensor substrate 201 is fixed to a base 205 by, for example, an adhesive, and supported by the base 205. The base 205 is fixed to the rear surface member 103 of the housing 104 by a column 206. The base 205 is made of, for example, an aluminum alloy, magnesium alloy, or fiber reinforced resin. A circuit substrate 207 and a rechargeable battery 209 are arranged on the opposite side of the imaging panel 204 to sandwich the base 205. A circuit for controlling the sensor substrate 201 is formed in the circuit substrate 207. For example, a circuit for driving the transistor of each pixel, a circuit for reading out a signal from each pixel, and a circuit for processing the readout signal are formed in the circuit substrate 207. The sensor substrate 201 and the circuit substrate 207 are connected by a flexible substrate 208. The rechargeable battery 209 supplies power to the sensor substrate 201 and the circuit substrate 207. The radiation imaging apparatus 100 may include a power supply circuit for supplying externally supplied power to each circuit, instead of the rechargeable battery 209. In the following description, the circuit substrate 207 and the rechargeable battery 209 will be collectively referred to as electric components hereinafter.

The buffer member 210 and the electrically conductive member 211 are arranged between the imaging panel 204 and the transmission plate 101. The electrically conductive member 211 is positioned between the buffer member 210 and the imaging panel 204. The electrically conductive member 211 is fixed to the surface of the buffer member 210 on the side of the imaging panel 204 by, for example, an adhesive. Only a portion near the edge of the electrically conductive member 211 may be fixed to the buffer member 210, only inner side of the electrically conductive member 211 may be fixed to the buffer member 210, or the entire surface of the electrically conductive member 211 may be fixed to the buffer member 210. The buffer member 210 is made of an elastic material such as a formed material. The electrically conductive member 211 is a metal foil made of aluminum, copper, or the like. The electrically conductive member 211 has a uniform thickness of, for example, 0.2 mm or less. The electrically conductive member 211 is connected to a conductive portion of the housing 104 by an electrically conductive line 212. Referring to FIGS. 1A and 1B, the electrically conductive member 211 is connected to the frame member 102 by the electrically conductive line 212. Instead, the electrically conductive member 211 may be connected to the rear surface member 103, or connected to the base 205 when the base 205 is conductive. The radiation imaging apparatus 100 need not include the electrically conductive line 212.

Since the electrically conductive member 211 is fixed to the buffer member 210, it is possible to reduce a change in capacitance caused by a vibration of the electrically conductive member 211. Since an external force on the radiation imaging apparatus 100 is exerted on the electrically conductive member 211 through the buffer member 210, it is possible to prevent the electrically conductive member 211 from being broken by the external force, thereby improving the impact resistance. Furthermore, the electrically conductive member 211 is spaced apart from the housing 104. Therefore, a force generated by deformation of the housing 104 is prevented from being applied to the electrically conductive member 211.

Radiation emitted from a radiation generation apparatus (not shown in FIGS. 1A, 1B, 2A, and 2B) is transmitted through an object (not shown in FIGS. 1A, 1B, 2A, and 2B), and then passes through the transmission plate 101 to be incident on the radiation imaging apparatus 100. The incident radiation is converted into light by the scintillator 202, and the light is converted into an electrical signal by the photoelectric conversion element of the sensor substrate 201. This electrical signal is read out by the circuit substrate 207, and transferred outside the radiation imaging apparatus 100.

Subsequently, the positional relationship between the side wall of the housing 104, the sensor substrate 201, the base 205, and the electrically conductive member 211 in the planar view with respect to the incident surface 100a of the radiation imaging apparatus 100 will be described with reference to FIG. 2B. The edge of the buffer member 210 coincides with that of the electrically conductive member 211 in the planar view with respect to the incident surface 100a. In the planar view with respect to the incident surface 100a, the edge of the electrically conductive member 211 surrounds the edge of the effective region 201a of the sensor substrate 201. That is, each side of the edge of the electrically conductive member 211 exists outside the effective region 201a of the sensor substrate 201. Furthermore, in the planar view with respect to the incident surface 100a, the edge of the electrically conductive member 211 also surrounds the edge of the sensor substrate 201 and the edge of the base 205. Since the edge of the sensor substrate 201 defines the edge of the imaging panel 204, the edge of the electrically conductive member 211 surrounds the edge of the imaging panel 204 in the planar view with respect to the incident surface 100a.

Radiation noise from the outside of the radiation imaging apparatus 100, especially radiation noise from a radiation incident direction causes an eddy current in the electrically conductive member 211. This eddy current can reduce radiation noise which reaches the imaging panel 204. As a closed circuit formed by the eddy current is larger, the effect of reducing radiation noise is higher. Since the electrically conductive member 211 has a size such that the edge of the electrically conductive member 211 surrounds the edge of the effective region 201a of the sensor substrate 201, and also surrounds the edge of the imaging panel 204, it is possible to sufficiently reduce radiation noise.

The positional relationship between the respective components of the radiation imaging apparatus 100 is not limited to that shown in FIG. 2B. For example, some or all of the sides of the edge of the electrically conductive member 211 may be positioned between the edge of the effective region 201a of the sensor substrate 201 and the edge of the sensor substrate 201.

Figure 3A:
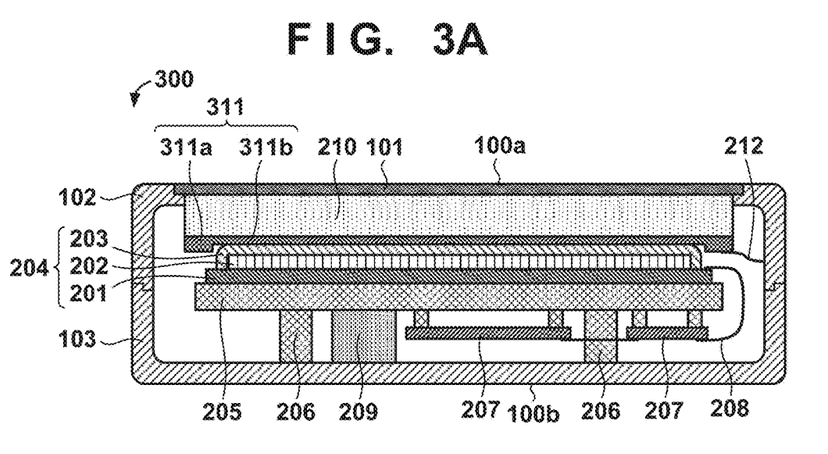
FIGS. 3A and 3B are a sectional view and plan view, respectively, showing a radiation imaging apparatus according to some embodiments.
Figure 3B:
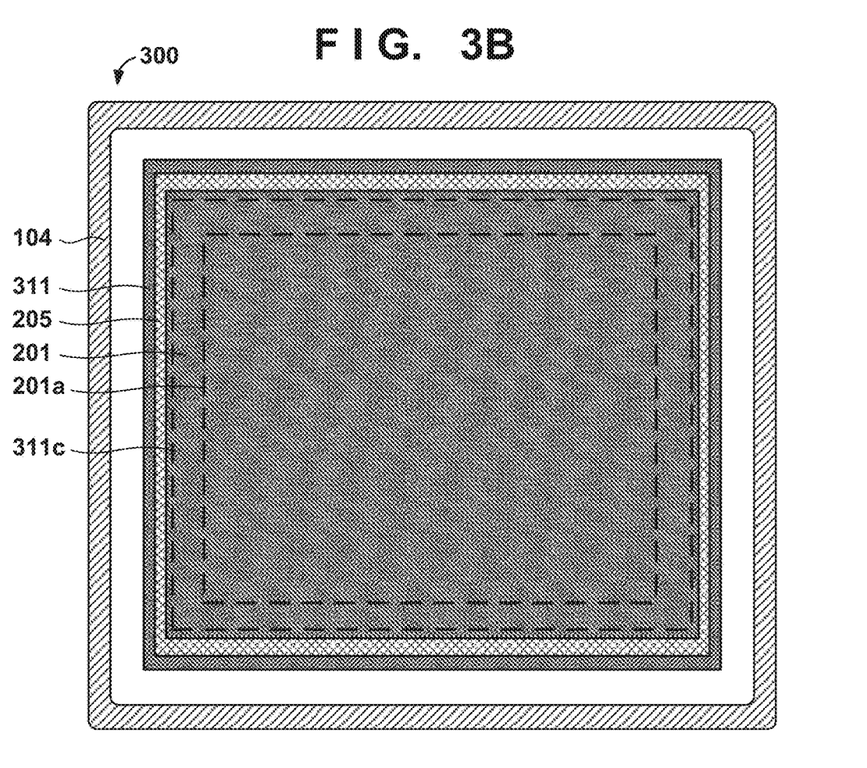

Subsequently, a radiation imaging apparatus 300 according to some other embodiments will be described with reference to FIGS. 3A and 3B. FIG. 3A is a sectional view showing the radiation imaging apparatus 300 at a position corresponding to FIG. 2A. FIG. 3B is a plan view showing the radiation imaging apparatus 300. Note that FIG. 3B shows only some components to clarify the positional relationship between respective elements.

The radiation imaging apparatus 300 is different from the radiation imaging apparatus 100 in that an electrically conductive member 311 is included instead of the electrically conductive member 211, but other points may be the same. The electrically conductive member 311 is fixed to a surface of a buffer member 210 on the side of an imaging panel 204 by, for example, an adhesive. The electrically conductive member 311 includes an outer portion 311a having a frame shape, and an inner portion 311b inside the outer portion 311a. The outer portion 311a is thicker than the inner portion 311b. For example, the thickness of the outer portion 311a is 0.2 mm, and the thickness of the inner portion 311b is 0.1 mm. Only the outer portion 311a of the electrically conductive member 311 may be fixed to the buffer member 210, only the inner portion 311b of the electrically conductive member 311 may be fixed to the buffer member 210, or the entire surface of the electrically conductive member 311 may be fixed to the buffer member 210.

Subsequently, the positional relationship between the side wall of a housing 104, a sensor substrate 201, a base 205, and the electrically conductive member 311 in a planar view with respect to an incident surface 100a of the radiation imaging apparatus 300 will be described with reference to FIG. 3B. The position of the edge of the electrically conductive member 311 is the same as that of the edge of the electrically conductive member 211 and a description thereof will be omitted. FIG. 3B shows, by a broken line, a boundary 311c between the outer portion 311a and inner portion 311b of the electrically conductive member 311. In the planar view with respect to the incident surface 100a, the boundary 311c of the electrically conductive member 311 surrounds the edge of an effective region 201a of the sensor substrate 201. Furthermore, in the planar view with respect to the incident surface 100a, the boundary 311c of the electrically conductive member 311 is surrounded by the edge of the sensor substrate 201 and the edge of the base 205. Since the edge of the sensor substrate 201 defines the edge of the imaging panel 204, the boundary 311c of the electrically conductive member 311 is surrounded by the edge of the imaging panel 204 in the planar view with respect to the incident surface 100a.

The positional relationship between the respective components of the radiation imaging apparatus 300 is not limited to that shown in FIG. 3B. For example, some or all of the sides of the boundary 311c of the electrically conductive member 311 may be positioned outside the edge of the sensor substrate 201, and may be positioned outside the edge of the base 205.

As described above, as a closed circuit formed by an eddy current is larger, the effect of reducing radiation noise is higher. Therefore, the weight of the radiation imaging apparatus 300 can be reduced while radiation noise is efficiently reduced by making the outer portion 311a thicker than the inner portion 311b of the electrically conductive member 311 to decrease a resistance value.

Figure 4A:
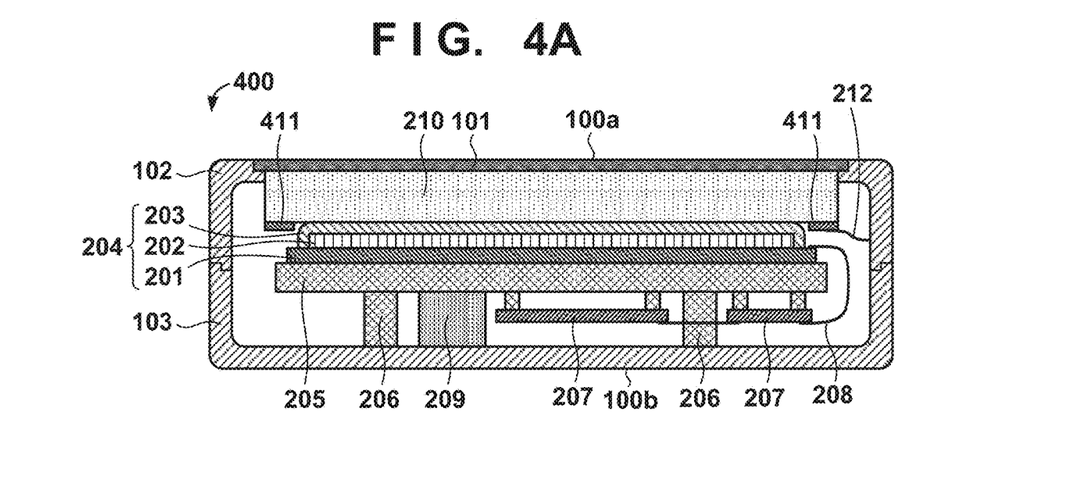
FIGS. 4A and 4B are a sectional view and plan view, respectively, showing a radiation imaging apparatus according to some embodiments.
Figure 4B:
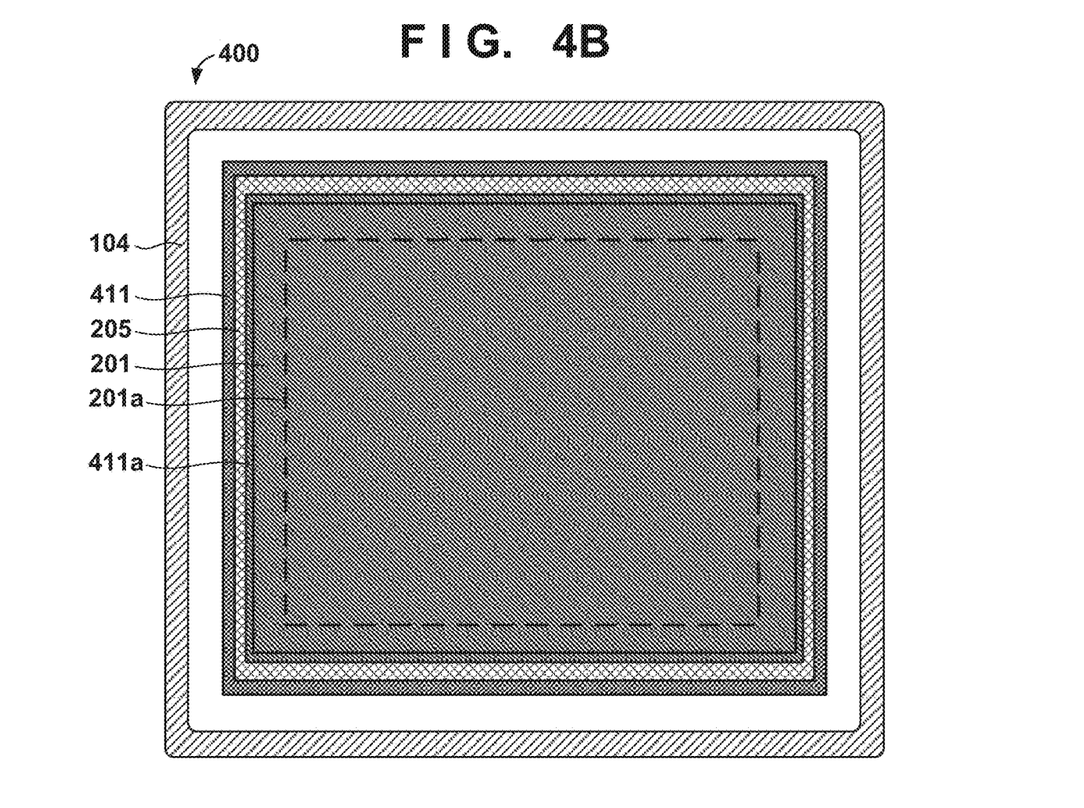

A radiation imaging apparatus 400 according to some other embodiments will be described with reference to FIGS. 4A and 4B. FIG. 4A is a sectional view showing the radiation imaging apparatus 400 at a position corresponding to FIG. 3A. FIG. 4B is a plan view showing the radiation imaging apparatus 400. Note that FIG. 4B shows only some components to clarify the positional relationship between respective elements.

The radiation imaging apparatus 400 is different from the radiation imaging apparatus 300 in that an electrically conductive member 411 is included instead of the electrically conductive member 311, but other points may be the same. The electrically conductive member 411 is different from the electrically conductive member 311 in that an opening is included instead of the inner portion 311b, but other points may be the same. That is, the electrically conductive member 411 is a member having a frame shape including an opening. The electrically conductive member 411 is fixed to a surface of a buffer member 210 on the side of an imaging panel 204 by, for example, an adhesive. For example, the thickness of the electrically conductive member 411 is 0.2 mm. As shown in FIG. 4A, in the opening of the electrically conductive member 411, the buffer member 210 and the imaging panel 204 may be in contact with each other. Alternatively, the buffer member 210 and the imaging panel 204 may be spaced apart from each other.

The positional relationship between the side wall of a housing 104, a sensor substrate 201, a base 205, and the electrically conductive member 411 in a planar view with respect to an incident surface 100a of the radiation imaging apparatus 400 will be described with reference to FIG. 4B. The position of the edge of the electrically conductive member 411 is the same as that of the edge of the electrically conductive member 311 and a description thereof will be omitted. The position of an edge 411a of the opening of the electrically conductive member 411 is the same as that of the boundary 311c of the electrically conductive member 311 and a description thereof will be omitted. The radiation imaging apparatus 400 efficiently reduces radiation noise, and has a lighter weight than that of the radiation imaging apparatus 300.

Figure 5A:
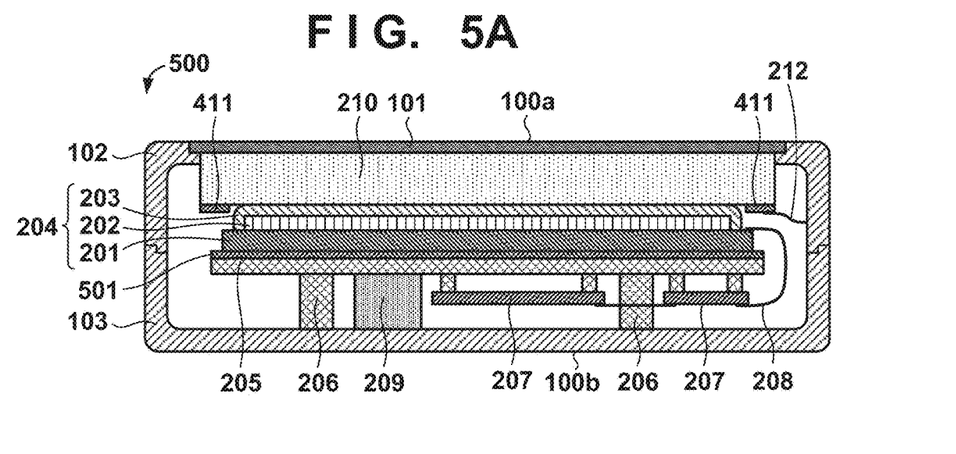
FIGS. 5A to 5C are sectional views and perspective view, respectively, showing a radiation imaging apparatus according to some embodiments.
Figure 5B:
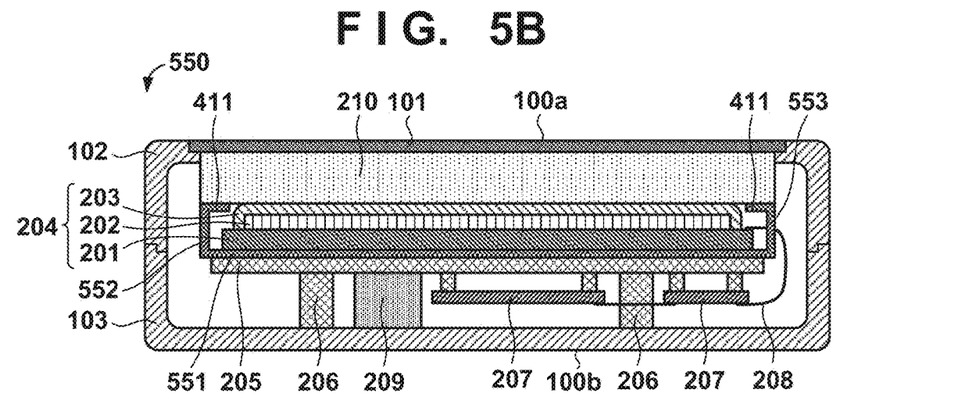
Figure 5C:
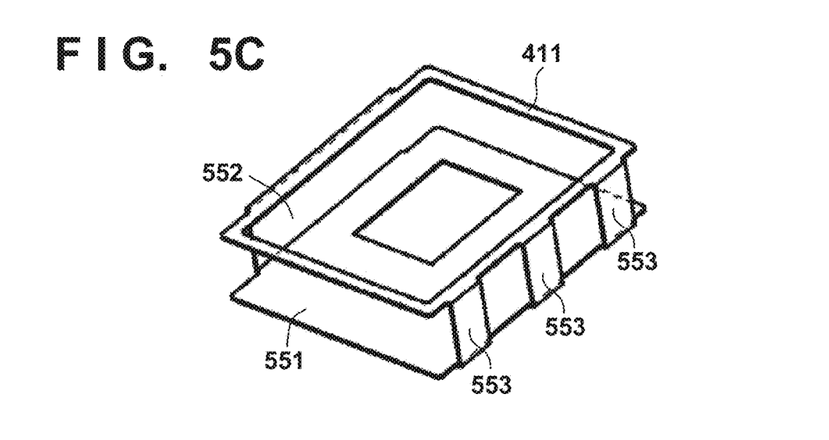

Radiation imaging apparatuses 500 and 550 according to some other embodiments will be described with reference to FIGS. 5A to 5C. FIG. 5A is a sectional view showing the radiation imaging apparatus 500 at a position corresponding to FIG. 4A. FIG. 5B is a sectional view showing the radiation imaging apparatus 550 at a position corresponding to FIG. 4A.

The radiation imaging apparatus 500 is different from the radiation imaging apparatus 400 in that an electrically conductive member 501 is further included, but other points may be the same. The electrically conductive member 501 may be added to the radiation imaging apparatus 100 or 300, instead of the radiation imaging apparatus 400. The electrically conductive member 501 is arranged between an imaging panel 204 and a base 205. The electrically conductive member 501 may have a uniform thickness like the electrically conductive member 211, have a shape in which an inner portion is thinner than an outer portion like the electrically conductive member 311, or have an opening like the electrically conductive member 411. The electrically conductive member 501 may be a metal foil made of aluminum, copper, or the like and having a thickness of 0.2 mm like the electrically conductive member 411, or may be made of a noble metal having a high radiation shielding effect, for example, lead, tungsten, iron, copper, molybdenum, or gold. One electrically conductive member 411 can obtain the radiation shielding effect and the effect of reducing radiation noise from the outside, thereby reducing the weight of the radiation imaging apparatus 500.

In a space sandwiched between the electrically conductive members 411 and 501, radiation noise from the radiation incident direction is reduced. This is because an eddy current flowing to the electrically conductive member 411 and an eddy current flowing to the electrically conductive member 501 are superimposed on each other to produce an effect, and the eddy currents generate magnetic fields in the opposite directions especially near the edge of the space sandwiched between the electrically conductive members to cancel each other. The radiation imaging apparatus 500 includes, on the side of the imaging panel 204, no electrically conductive member for connecting the electrically conductive members 411 and 501. Therefore, as compared with a case in which the imaging panel 204 is covered with the electrically conductive member as a whole, the weight of the radiation imaging apparatus can be reduced.

Referring to FIG. 5A, the electrically conductive member 501 is arranged between the imaging panel 204 and the base 205. Instead, the electrically conductive member 501 may be arranged between a circuit substrate 207 and a rear surface member 103. If the electrically conductive member 501 is arranged at this position, radiation noise to the circuit substrate 207 can be reduced. On the other hand, if the electrically conductive member 501 is arranged near the imaging panel 204, radiation noise to the imaging panel 204 can be largely reduced.

If the electrically conductive member 501 has rigidity which can support the imaging panel 204, the electrically conductive member 501 may serve as the base 205. That is, the base 205 may be eliminated from the radiation imaging apparatus 500, and the electrically conductive member 501 may be fixed to the rear surface member 103 by a column 206.

The radiation imaging apparatus 550 is different from the radiation imaging apparatus 400 in that electrically conductive members 551, 552, and 553 are further included, but other points may be the same. The electrically conductive members 551, 552, and 553 may be added to the radiation imaging apparatus 100 or 300, instead of the radiation imaging apparatus 400. The electrically conductive member 551 is the same as the electrically conductive member 501 and a description thereof will be omitted. FIG. 5C is a perspective view showing the structure of an electrically conductive member 411 and the electrically conductive members 551, 552, and 553. The electrically conductive member 552 connects one side of the electrically conductive member 411 and one side of the electrically conductive member 551. The electrically conductive member 553 connects another one side of the electrically conductive member 411 and another one side of the electrically conductive member 551. The electrically conductive members 552 and 553 are positioned on a pair of two sides opposite each other. No electrically conductive members are arranged on the remaining two opposite sides. The material and thickness of each of the electrically conductive members 552 and 553 may be the same as those of the electrically conductive member 411. By arranging the electrically conductive members 552 and 553, it is possible to reduce radiation noise from the side of the imaging panel 204.

In the above description, each of the electrically conductive members 211, 311, and 411 is fixed to the surface of the buffer member 210 on the imaging panel side. Instead, each of the electrically conductive members 211, 311, and 411 may be fixed to the surface of the buffer member 210 on the side of the incident surface 100a. Furthermore, each of the electrically conductive members 211, 311, and 411 may be wrapped in the buffer member 210, and fixed to the inside of the buffer member 210. As each of the electrically conductive members 211, 311, and 411 is arranged closer to the imaging panel 204, radiation noise to the imaging panel 204 can be reduced.

Figure 6:
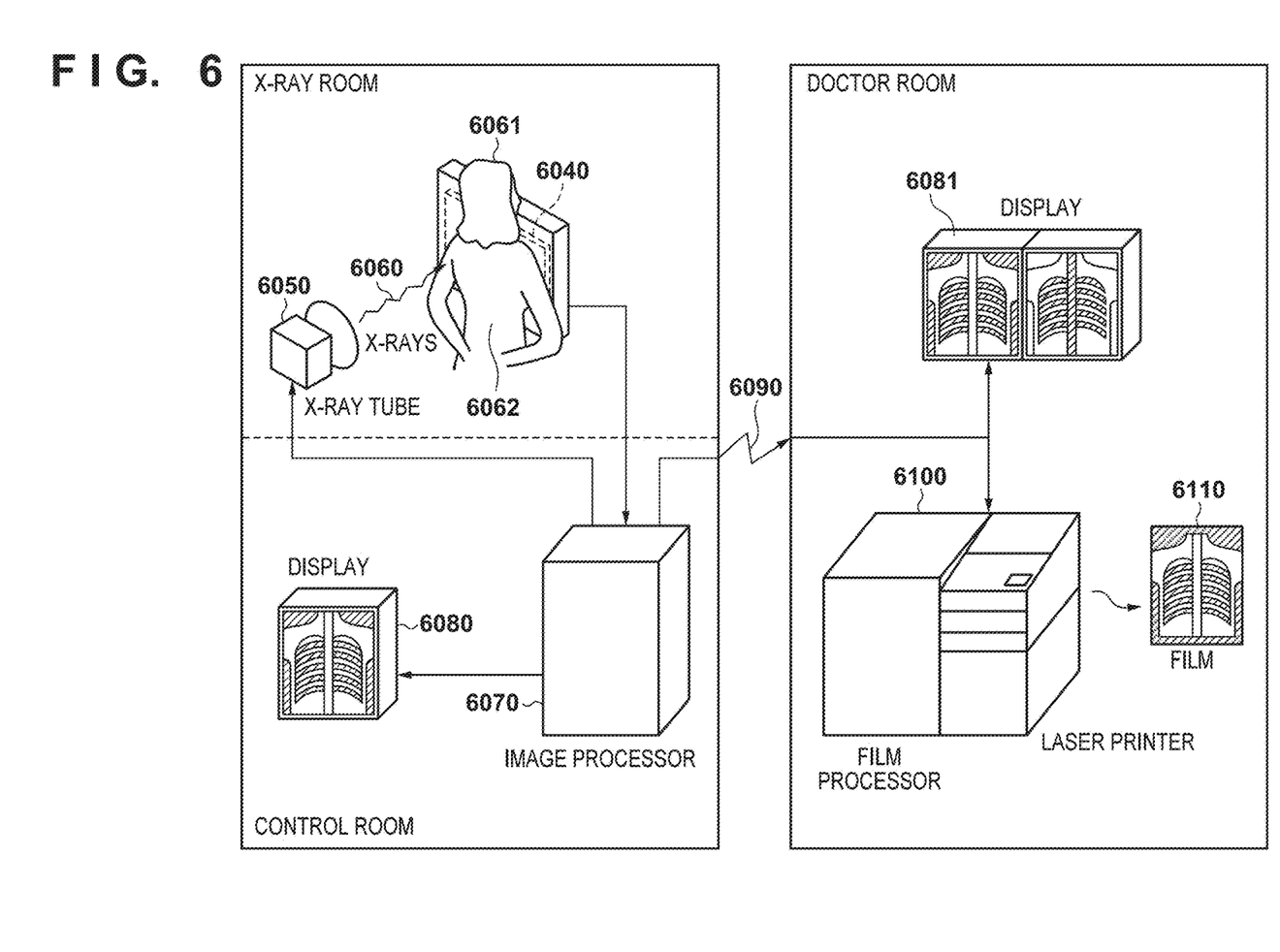
FIG. 6 is a view for explaining a radiation imaging system according to some embodiments.

FIG. 6 is a view showing an application example of the above-described radiation imaging apparatus to an X-ray diagnostic system (radiation imaging system). X-rays 6060 generated as radiation by an X-ray tube 6050 (radiation source) are transmitted through a chest 6062 of a subject or patient 6061, and are incident on a detection apparatus 6040. The detection apparatus 6040 may be the above-described radiation imaging apparatus 100, 300, 400, 500, or 550. The incident X-rays include the internal information of the patient 6061. A scintillator emits light in correspondence with the incidence of the X-rays, and photoelectrically converts the light, thereby obtaining electrical information. This information is converted into a digital signal, undergoes image processing by an image processor 6070 serving as a signal processing unit, and can be observed on a display 6080 serving as a display unit in the control room. Note that the radiation imaging system includes at least the radiation imaging apparatus, and the signal processing unit for processing a signal from the radiation imaging apparatus.

This information can also be transferred to a remote site by a transmission processing unit such as a telephone line 6090. The information can also be displayed on a display 6081 serving as a display unit in, for example, a doctor room of another place or saved in a recording unit such as an optical disk. Consequently, a doctor in the remote site can make a diagnosis. The information can also be recorded in a film 6110 serving as a recording medium by a film processor 6100 serving as a recording unit.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-082061, filed Apr. 13, 2015, which is hereby incorporated by reference herein in its entirety.

What is claimed is:

1. A radiation imaging apparatus comprising:
    a housing including a transmission plate with an incident surface of radiation;
    an imaging panel stored in the housing and including an effective region for detecting radiation incident through the incident surface;
    a buffer member arranged between the incident surface and the imaging panel; and
    an electrically conductive member fixed to the buffer member, wherein
    an edge of the electrically conductive member surrounds an edge of the effective region in a planar view with respect to the incident surface, and
    the transmission plate and the buffer member are stacked.

2. The apparatus according to claim 1, wherein the edge of the electrically conductive member surrounds an edge of the imaging panel in the planar view with respect to the incident surface.

3. The apparatus according to claim 1, wherein the electrically conductive member is fixed to a surface of the buffer member on a side of the imaging panel.

4. The apparatus according to claim 1, wherein the electrically conductive member includes a first portion having a frame shape and a second portion surrounded by the first portion, and
    the first portion is thicker than the second portion.

5. The apparatus according to claim 4, wherein a boundary between the first portion and the second portion surrounds the edge of the effective region in the planar view with respect to the incident surface.

6. The apparatus according to claim 4, wherein a boundary between the first portion and the second portion surrounds an edge of the imaging panel in the planar view with respect to the incident surface.

7. The apparatus according to claim 1, wherein the electrically conductive member has a frame shape including an opening.

8. The apparatus according to claim 7, wherein an edge of the opening surrounds the edge of the effective region in the planar view with respect to the incident surface.

9. The apparatus according to claim 7, wherein an edge of the opening surrounds an edge of the imaging panel in the planar view with respect to the incident surface.

10. The apparatus according to claim 7, wherein the imaging panel and the buffer member are in contact with each other in the opening.

11. The apparatus according to claim 1, further comprising an electrically conductive line configured to electrically connect the electrically conductive member and the housing.

12. The apparatus according to claim 1, wherein the electrically conductive member is a first electrically conductive member, and
the radiation imaging apparatus further comprises a second electrically conductive member between the imaging panel and a surface of the housing on an opposite side of the incident surface.

13. The apparatus according to claim 12, wherein the radiation imaging apparatus includes no electrically conductive member configured to connect the first electrically conductive member and the second electrically conductive member to each other.

14. The apparatus according to claim 12, wherein the radiation imaging apparatus further comprises:
a third electrically conductive member arranged on a first side of the imaging panel and configured to connect the first electrically conductive member and the second electrically conductive member to each other;
a fourth electrically conductive member arranged on a second side of the imaging panel on an opposite side of the first side and configured to connect the first electrically conductive member and the second electrically conductive member to each other; and
includes, on a side of the imaging panel different from the first side and the second side, no electrically conductive member configured to connect the first electrically conductive member and the second electrically conductive member to each other.

15. A radiation imaging system, comprising a radiation imaging apparatus and a signal processing unit for processing a signal obtained by the radiation imaging apparatus,
the radiation imaging apparatus comprising:
a housing including a transmission plate with an incident surface of radiation;
an imaging panel stored in the housing and including an effective region for detecting radiation incident through the incident surface;
a buffer member arranged between the incident surface and the imaging panel; and
an electrically conductive member fixed to the buffer member, wherein
an edge of the electrically conductive member surrounds an edge of the effective region in a planar view with respect to the incident surface, and
the transmission plate and the buffer member are stacked.

* * * * *